US009732929B2

(12) United States Patent
Kürpick et al.

(10) Patent No.: US 9,732,929 B2
(45) Date of Patent: Aug. 15, 2017

(54) LIGHT MODULE FOR A VEHICLE HEADLAMP

(71) Applicant: Hella KGaA Hueck & Co., Lippstadt (DE)

(72) Inventors: Rainer Kürpick, Paderborn (DE); Metha Martin Waga, Lippstadt (DE); Franz-Georg Willeke, Anröchte (DE)

(73) Assignee: Hella KGaA Hueck & Co., Lippstadt (DE)

( * ) Notice: Subject to any disclaimer, the term of this patent is extended or adjusted under 35 U.S.C. 154(b) by 0 days.

(21) Appl. No.: 14/704,448

(22) Filed: May 5, 2015

(65) Prior Publication Data

US 2015/0354775 A1 Dec. 10, 2015

(30) Foreign Application Priority Data

May 7, 2014 (DE) ........................ 10 2014 106 342

(51) Int. Cl.
*B60Q 1/00* (2006.01)
*F21S 8/10* (2006.01)

(52) U.S. Cl.
CPC ......... *F21S 48/325* (2013.01); *F21S 48/1159* (2013.01); *F21S 48/137* (2013.01); *F21S 48/321* (2013.01); *F21S 48/328* (2013.01); *F21S 48/34* (2013.01)

(58) Field of Classification Search
CPC ....... F21S 48/325; F21S 48/115; F21V 29/20; F21V 29/60; F21V 29/67
USPC .................................................. 362/459–549
See application file for complete search history.

(56) References Cited

U.S. PATENT DOCUMENTS

2007/0076422 A1* 4/2007 Nicolai ................ B60Q 1/0041 362/547
2012/0092885 A1* 4/2012 Hong .................... F21S 48/335 362/547
2014/0328079 A1* 11/2014 Itagaki .................... F21V 29/02 362/547

FOREIGN PATENT DOCUMENTS

DE 102005038186 A1 2/2007

* cited by examiner

*Primary Examiner* — William Carter
(74) *Attorney, Agent, or Firm* — Husch Blackwell LLP

(57) ABSTRACT

The invention relates to a light module for a vehicle headlamp, having at least one semiconductor light source and having at least one mounting plate. The semiconductor light source is accommodated on a receiving side of the mounting plate. The mounting plate is disposed on the heat sink with a cooling side lying opposite the receiving side, At least one semiconductor light source can be cooled. The heat sink has air guidance grooves on its side bordering the cooling side of the mounting plate, by means of which air guidance channels are formed over the cooling side of the mounting plate.

10 Claims, 2 Drawing Sheets

LIGHT MODULE FOR A VEHICLE HEADLAMP

CROSS REFERENCE

This application claims priority to German Application No. 10 2014 106342.2, filed May 7, 2014, which is hereby incorporated by reference.

FIELD OF TECHNOLOGY

The present invention relates to a light module for a vehicle headlamp, having at least one semiconductor light source and having at least one mounting plate, wherein the semiconductor light source is accommodated on a receiving side of the mounting plate, and having a heat sink, on which the mounting plate is disposed with a cooling side lying opposite the receiving side, and with which the at least one semiconductor light source can be cooled.

BACKGROUND

Light modules equipped with semiconductor light sources, i.e. LEDs, can now fulfill primary light functions therewith, such that the semiconductor light sources must be cooled accordingly. For this, heat sinks are frequently used, and when semiconductor light sources, e.g. one or more LEDs, are accommodated on a mounting plate, then this mounting plate can then be disposed on a heat sink. The heat sink usually serves thereby as a base body and mounting body or receiving body, such that the mounting plate is held in place via the heat sink. The semiconductor sources can be accommodated on a receiving side of the mounting plate, and the mounting plate is attached to the heat sink via a cooling side lying opposite the receiving side, such that the semiconductor light sources can be cooled through the mounting plate.

Ventilators are frequently provided in order to increase the cooling power, which ventilators generate an air flow that is blown onto the heat sink, in particular over the cooling side thereof. For this, heat sinks frequently have a planar base side, for accommodating a mounting plate having semiconductor light sources, and a cooling side of the heat sink is located on the side opposite the base side, which is provided with a cooling structure. The mounting plate for accommodating the at least one semiconductor light source lies flat with its entire surface on the base side of the heat sink thereby. The air flow from the ventilator is generated only on the cooling side of the heat sink thereby, such that the mounting plate is not exposed to the air flow of the heat sink.

By way of example, DE 10 2009 033 909 A1 shows a light module for a main lighting function of a headlamp, and a semiconductor light source is accommodated on a heat sink, wherein the heat sink has cooling fins, and a cooling structure is disposed on the cooling side opposite the receiving side of the heat sink, which is subjected to the air flow from the ventilator.

A disadvantage thereby is that this results in very heavy light modules, usually having a large and massive heat sink, and a substantial portion of the weight of the light module is caused by the heat sink. Because of the heavy weight, further difficulties arise concerning the accommodation of a light module in the housing for a headlamp, such that it is desirable to provide a light module, having a high cooling power for cooling the at least one semiconductor light source, which has a lighter weight.

DE 10 2007 043 961 A1 shows a light module for a main lighting function of a headlamp having a semiconductor light source, and the semiconductor light source is disposed on a heat sink, which is located in an air guidance channel. An air flow is generated in the air channel by means of a ventilator, such that the semiconductor light sources can be effectively cooled by means of the heat sink and by the air flow. An embodiment of a light module with a lower weight, however, is also impossible with this embodiment, without taking further measures.

WO 2009/048436 A1 shows another design for a light module, wherein a heat sink is provided and serves as an accommodation for the semiconductor light source, and on which cooling channels are formed on the cooling side of the heat sink, through which an air flow generated with a ventilator is guided in order to cool the semiconductor light sources. The semiconductor light sources are disposed on the heat sink via a mounting plate, wherein no air flow is provided on the side of the heat sink on which the mounting plate is disposed, thus not enabling any convection cooling of the mounting plate itself.

SUMMARY OF THE INVENTION

The object of the invention is a further development of a light module for a vehicle headlamp, having a light weight, and having an effective cooling of at least one semiconductor light source, which is disposed on a mounting plate. The particularly effective cooling of the semiconductor light source should also be achieved when a heat sink is designed to be as small as possible, or having a lower mass, which should be achieved, in particular, by means of an optimized air guidance of an air flow that can be generated by a ventilator.

The invention includes the technical teaching that the heat sink has air guidance grooves on its side bordering the cooling side of the mounting plate, by means of which air guidance channels are formed over the cooling side of the mounting plate.

Air guidance grooves can be formed in the heat sink by means of the design of the heat sink according to the invention in conjunction with the mounting plate disposed thereon, which form air guidance channels, the formation of which also involves the cooling side of the mounting plate. If an air flow is guided through the air guidance channels, then the mounting plate can be cooled by the heat sink in the conventional manner, while at the same time, however, a convection is also formed over the cooling side of the mounting plate, by means of which, together with the heat sink, a particularly effective cooling of the semiconductor light source can be achieved. The further advantage obtained thereby is that the heat sink does not need to be enlarged in order to improve the cooling power, and the air guidance grooves can be designed such that the mass of the heat sink is reduced even further thereby.

In order for a direct cooling of the mounting plate via the heat sink to be able to occur, the heat sink can have contact regions formed between the air guidance grooves, in particular such that they are intermittent therewith, in which a thermal conductive contact to the mounting plate is formed. One or more semiconductor light sources can be accommodated on the mounting plate, wherein the contact regions on the cooling side of the mounting plate are formed there, wherein the semiconductor light sources are attached to the mounting plate on the opposing, receiving side thereof. As a result, a direct heat dissipation from the semiconductor light source through the thickness of the mounting plate into the heat sink can occur, wherein a cooling of the semiconductor light source over the region of the air guidance channels is achieved by a thermal conductance in the mounting plate itself.

In order to obtain a good thermal conductance, the mounting plate can be formed, at least in part, of metal, and/or the mounting plate can have at least one planar metallic coating, in particular comprising aluminum, copper or brass.

To further advantage, a ventilator can be provided and disposed such that an air flow that can be generated with the ventilator can be guided through the air guidance channels. By way of example, a single ventilator can be provided as a component of the light module, and numerous air flows can be provided by the ventilator via an air guidance channel, such that when a ventilator is in operation, all of the air guidance channels are aerated with an air flow.

The light module can, for example, have only one mounting plate, which is disposed on the heat sink. In accordance with this variation, the heat sink can have a cooling structure, in particular having cooling fins, on a cooling side lying opposite the side for accommodating the mounting plate.

In accordance with a further variation, it is possible that the light module has two or more mounting plates, lying opposite one another, which are disposed on a common heat sink. For this, the heat sink can have a first side on which a first mounting plate is disposed, and the heat sink can have a second side, lying opposite the first side, on which a second mounting plate is disposed. Air guidance grooves can be provided thereby on both sides of the heat sink, by means of which respective air guidance channels are formed over the bordering cooling sides of the mounting plates. The air guidance grooves can be formed such that they are offset on the opposing sides of the heat sink, such that the heat sink assumes a meandering form.

The light module can have one or more reflectors, and a reflector can be disposed, for example, on one or both sides of the heat sink, into which the light that can be generated by the semiconductor can be irradiated, which is emitted in a light axis after reflection on the reflector. The air guidance grooves in the heat sink can basically face in the direction of the light axis thereby. If the air flow is heated when flowing through the air guidance channels, then it can strike the cover lens of the light module, such that it can be defrosted, for example, from the interior of the headlamp.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
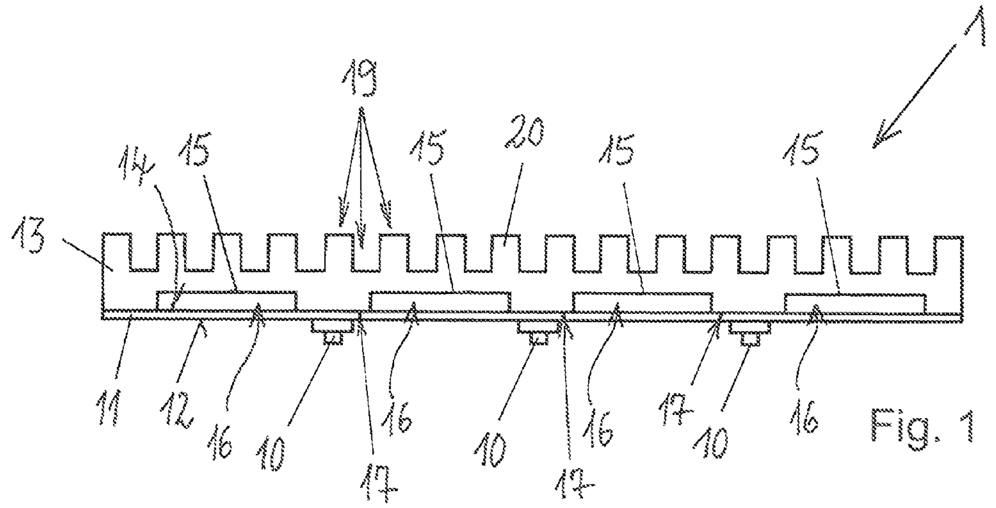
FIG. 1 shows a first exemplary embodiment of a light module having a heat sink, wherein a mounting plate is disposed on one side of the heat sink.

FIG. 1 shows a light module 1 for a vehicle headlamp, having numerous semiconductor light sources 10 and having a mounting plate 11, wherein the semiconductor light sources 10 are accommodated on a receiving side 12 of the mounting plate 11. The semiconductor light sources 10 can serve, for example, for fulfilling a main lighting function, i.e. a low beam or a high beam of the headlamp.

The heat sink 13 is disposed on a cooling side 14 of the mounting plate 11, lying opposite the receiving side 12, wherein the manner in which the heat sink 13 is attached to the cooling side 14 is not shown in detail. By way of example, it can be attached to the heat sink 13 via a thermal conductive paste or some other material bonding joining process. The mounting plate 11, however, can also border on the heat sink without a material bonding.

Air guidance grooves 15 are formed in the surface of the heat sink 13, in the side of the heat sink 13 on which the mounting plate 11 is attached, said side normally being planar in design, and the air guidance grooves 15 are covered by the arrangement of the mounting plate 11, thus forming air guidance channels 16, wherein the cooling side 14 of the mounting plate 11 contributes to the formation of the channels 16. If an air flow, generated by a ventilator for example, is guided through the air guidance channels 16, then both the heat sink 13 as well as, directly, the mounting plate 11 over the cooling side 14, are cooled. As a result, a particularly effective cooling of the semiconductor light sources 10 is made possible.

The heat sink 13 has contact regions 17 formed between the air guidance grooves 15, in particular, intermittent with the air guidance grooves 15, in which the heat sink 13 comes in contact with the cooling side 14 of the mounting plate 11, and the semiconductor light sources 10 are disposed, opposing one another, in the contact regions 17. As a result, the semiconductor light sources 10 can be cooled by means of solid state thermal conductance through the mounting plate 11, from the receiving side 12 to the cooling side 14, and into the heat sink 13.

The exemplary embodiment shows only a single mounting plate 11 disposed on one side of the heat sink 13, and there is a cooling structure 19 having cooling fins 20 on an opposite side of the mounting plate. A further improvement of the thermal conductance via the heat sink 13 can be obtained with the cooling structure 19.

Figure 2:
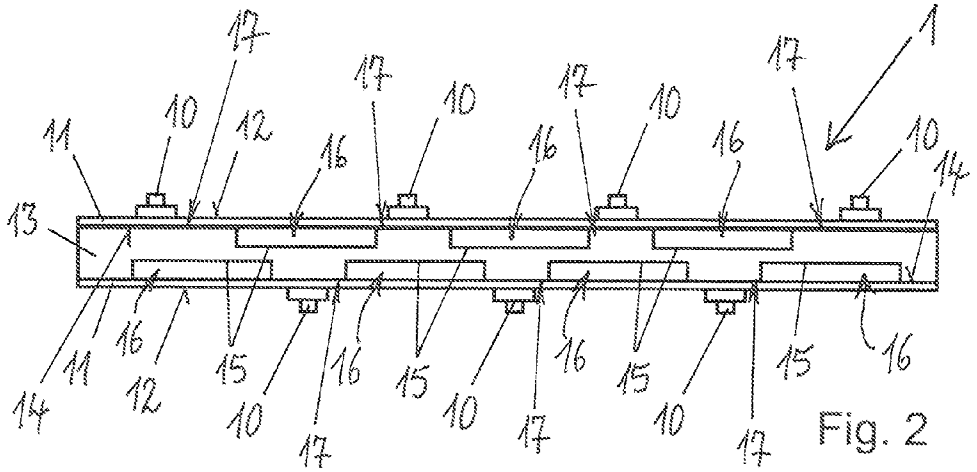
FIG. 2 shows another exemplary embodiment of a light module having a heat sink and having a first mounting plate on a first side of the heat sink and having a second mounting plate on a second side of the heat sink.

FIG. 2 shows a modified exemplary embodiment of a light module 1 having a heat sink 13, wherein a mounting plate 11 is disposed, in each case, on opposing sides of the heat sink 13. The receiving sides 12 of the mounting plates 11 face outward, and numerous semiconductor light sources 10 are disposed on the receiving sides 12. Air guidance grooves 15 are formed in the heat sink 13 on both sides bordering on the mounting plates 11, such that air guidance channels 16 are formed underneath the mounting plates 11, together with both cooling sides 14 of the mounting plates 11 and the air guidance grooves 15. The air guidance grooves 15 are disposed thereby, such that they are offset to one another and intermittent with respective contact regions 17, in which the cooling sides 14 of the mounting plates 11 border on the heat sink 13. The semiconductor light sources 10 are disposed opposite one another in the contact regions 17, such that they can be cooled directly via the heat sink 13.

If, as is shown in FIGS. 1 and 2, an air flow, which can be generated by a ventilator, for example, is guided through the air guidance channels 16, then an additional cooling of the heat sink can be obtained, wherein, in addition to the cooling by the heat sink 13, a heat dissipation is obtained via the cooling sides 15 of the mounting plates 11 bordering the air guidance channels 16. Heat occurring at the location of a semiconductor light source 10 is thus dissipated directly in the heat sink 13 via the contact region 17, as well as in the plane of the mounting plate 11, and thus via a convection of an air flow through the air guidance channel 16. For this, the mounting plate 11 can be formed at least in part of metal, to particular advantage, or the mounting plate 11 has at least one planar metallic coating, made of aluminum, copper or brass, for example.

Figure 3:
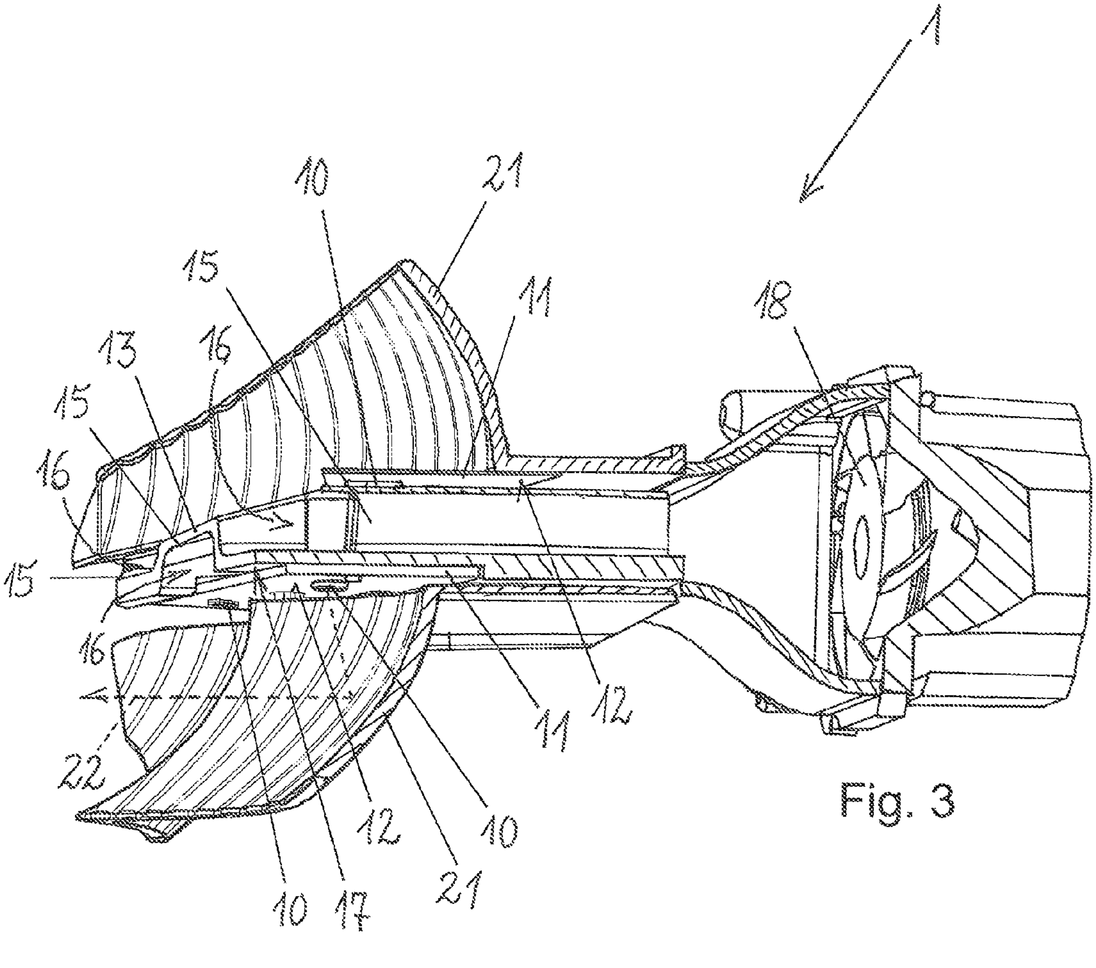
FIG. 3 shows a perspective view of a light module for a vehicle headlamp having the features of the present invention.

FIG. 3 shows, lastly, a design for a light module 1 in a perspective view, and a heat sink 13 is shown as a central component thereof, in which air guidance grooves 15 have been formed. A mounting plate 11 is disposed on each side of the heat sink 13, having semiconductor light sources 10 attached to the mounting plate 11. A closure of the air guidance grooves 15 is obtained by the arrangement of the mounting plates 11, such that air guidance channels 16 are formed. If an air flow is generated via the ventilator 18 shown in the Figure, it passes through the air guidance channels 16, and cools the heat sink 13, and also directly cools the mounting plate 11 by means of a convection.

The air guidance channels 16 extend in the direction of a light axis 22, which can face in the same direction in which a light, irradiated by the semiconductor light sources 10 into the reflectors 21 shown in the Figure, exits the light module 1. As a result, heated air can exit the front side of the heat sink 13 shown in the Figure, through the air guidance channels 16, and defrost, for example, a cover lens of the headlamp from the inside.

The invention is not limited in its design to the preferred exemplary embodiments described above. On the contrary, a number of variations are conceivable, which also can be used with the solution depicted here having fundamentally different embodiments. All of the features and/or advantages derived from the Claims, the description or the drawings, including constructive details or spatial configurations, may be essential to the invention, both in and of themselves as well as in the various combinations thereof.

LIST OF REFERENCE SYMBOLS

1 light module
10 semiconductor light source
11 mounting plate
12 receiving side
13 heat sink
14 cooling side
15 air guidance groove
16 air guidance channel
17 contact region
18 ventilator
19 cooling structure
20 cooling fins
21 reflector
22 light axis

The invention claimed is:

1. A light module for a vehicle headlamp comprising:

at least one semiconductor light source;

at least one mounting plate including each of a receiving side and a cooling side, the cooling side positioned opposite the receiving side, wherein the semiconductor light source is accommodated on the receiving side of the mounting plate, and a heat sink for cooling the at least one semiconductor light source, wherein said mounting plate is disposed on the heat sink, wherein the heat sink includes air guidance grooves formed in a first side of the heat sink that borders the cooling side of the mounting plate, wherein when the cooling side of the mounting plate and said air guidance grooves of said heat sink abut one another, the cooling side of the mounting plate covers the air guidance grooves to form air guidance channels, and wherein at least one air guidance channel is enclosed on three sides by the heat sink and on a fourth side by the mounting plate, thereby fully enclosing said at least one air guidance channel in cross-section.

2. The light module according to claim 1, wherein the heat sink has contact regions formed intermittently between the air guidance grooves in which a thermal conductive contact to the mounting plate is formed.

3. The light module according to claim 2, wherein one or more semiconductor light sources are disposed on the mounting plate in the contact regions on the receiving side.

4. The light module according to claim 1 wherein the mounting plate is made at least in part of metal, or in that the mounting plate has at least one planar metallic coating comprising aluminum, copper or brass.

5. The light module according to claim 1 wherein the light module includes a ventilator positioned and located such that an air current generated by the ventilator can be guided through the air guidance channels.

6. The light module according to claim 1 wherein the heat sink has a cooling structure on a cooling side lying opposite the side for accommodating the mounting plate, which comprises cooling fins.

7. The light module according to claim 1 wherein the heat sink has a first side, on which a first mounting plate is disposed, and wherein the heat sink has a second side lying opposite the first side, on which a second mounting plate is disposed, wherein both sides have air guidance grooves, by means of which the air guidance channels are formed over the adjacent cooling sides of the mounting plates.

8. The light module according to claim 7, wherein the heat sink has a meandering shape, formed by air guidance grooves formed on opposing sides of the heat sink, offset to one another.

9. The light module according to claim 1 wherein a reflector is located on one or both sides of the heat sink, wherein light can be generated by the semiconductor light source so that it can be irradiated into the reflector, and wherein the light is emitted in a light axis after reflection at the reflector.

10. The light module according to claim 9, wherein the air guidance grooves face in the direction of the light axis.

* * * * *